Patented Aug. 9, 1932

1,870,346

UNITED STATES PATENT OFFICE

OTTO RIPKE, OF ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

DECOMPOSITION PRODUCT OF UREA AS OR IN FERTILIZERS

No Drawing. Application filed May 29, 1928, Serial No. 281,590, and in Germany June 13, 1927.

The present invention concerns fertilizers, obtainable by heating urea until no more ammonia is evolved.

In accordance with the invention the products obtained by heating urea until no more ammonia is evolved have been found to be excellent fertilizers.

I prefer to perform the heating at a temperature of about 300° C., but it is to be understood, that all temperatures between that at which evolution of ammonia begins and that at which carbonization of the reaction products takes place may be suitable for performing the reaction. The compounds thus obtainable may be used either in form of the original mixture, the individual constituents thereof or artificial mixtures of these individual constituents with one another or with other soluble or insoluble nitrogenous or nitrogen-free fertilizers.

The advantage of these products over urea (which is readily soluble in water and rapidly consumed by the plants) lies in the slow assimilation of nitrogen conditioned by their sparing solubility. This not only avoids a sudden flooding of the plants by an excess of nitrogen supply, but also ensures a more complete utilization of the fertilizer, since the latter is not washed away by water (for example by a downpour of rain). Instead of the mixture of compounds obtainable by heating urea as described above, the individual chemical constituents present in this mixture, such as ammelide, cyanuric acid and the like, may, of course, be employed for the same purpose. Likewise these individual constituents can also be mixed together or used as additions to other soluble or insoluble nitrogenous or nitrogen-free fertilizers.

I claim:

1. A fertilizer containing as active constituents cyanuric acid and ammelide.

2. A fertilizer consisting of a mixture of compounds obtained by heating urea until no more ammonia is evolved, said mixture consisting principally of cyanuric acid and ammelide.

In testimony whereof I have hereunto set my hand.

OTTO RIPKE.